(12) United States Patent
Ortega Schulte et al.

(10) Patent No.: US 11,630,094 B2
(45) Date of Patent: Apr. 18, 2023

(54) LAYERS FOR THE DETECTION OF OXYGEN

(71) Applicant: HAMILTON BONADUZ AG, Bonaduz (CH)

(72) Inventors: Claudius-Michael Ortega Schulte, Bonaduz (CH); Dirk Schönfuss, Tamins (CH); Špela Willi, Bonaduz (CH); Sara Simonato, Chur (CH)

(73) Assignee: Hamilton Bonaduz AG, Bonaduz (CH)

( * ) Notice: Subject to any disclaimer, the term of this patent is extended or adjusted under 35 U.S.C. 154(b) by 701 days.

(21) Appl. No.: 16/342,175

(22) PCT Filed: Oct. 13, 2017

(86) PCT No.: PCT/EP2017/076193
§ 371 (c)(1),
(2) Date: Apr. 15, 2019

(87) PCT Pub. No.: WO2018/073120
PCT Pub. Date: Apr. 26, 2018

(65) Prior Publication Data
US 2019/0234918 A1    Aug. 1, 2019

(30) Foreign Application Priority Data
Oct. 18, 2016   (DE) .................... 10 2016 119 810.2

(51) Int. Cl.
*G01N 31/22* (2006.01)
*C08L 27/16* (2006.01)
(Continued)

(52) U.S. Cl.
CPC .............. *G01N 31/225* (2013.01); *C08J 5/18* (2013.01); *C08J 7/0427* (2020.01); *C08L 27/16* (2013.01);
(Continued)

(58) Field of Classification Search
CPC ................. G01N 31/225; G01N 21/77; G01N 2021/7786; C08J 7/0427; C08J 5/18; C08J 2327/16; C08J 2427/16; C08L 27/16
See application file for complete search history.

(56) References Cited

U.S. PATENT DOCUMENTS

| 2007/0243618 A1 | 10/2007 | Hatchett et al. |
| 2008/0228054 A1 | 9/2008 | Shults et al. |

(Continued)

FOREIGN PATENT DOCUMENTS

| CA | 1261717 A | 9/1989 |
| CN | 101301201 A | 11/2008 |

(Continued)

OTHER PUBLICATIONS

Hutter, L. H., et al. "Robustoptical oxygen sensors based on polymer-bound NIR-emitting platinum (II)-benzoporphyrins." Journal of Materials Chemistry C 2.36 (2014): 7589-7598. (Year: 2014).*

(Continued)

*Primary Examiner* — Robert J Eom
(74) *Attorney, Agent, or Firm* — Viksnins Harris Padys Malen LLP (57) ABSTRACT

Described is an oxygen permeable layer for detection of molecular oxygen, wherein the layer has a carrier material in which at least one particle is comprised, wherein the carrier material is polyvinylidene fluoride or a copolymer of polyvinylidene fluoride, and the particle comprises a polymer or a copolymer, wherein the polymer or copolymer of the particle has a chemically covalently bonded indicator compound for detection of molecular oxygen. In addition, a multilayer system for detection of molecular oxygen is described. Also described are a method for producing the (Continued)

layer, and the use of the layer or of the multilayer system for detection of molecular oxygen.

20 Claims, 3 Drawing Sheets (51) Int. Cl.
*G01N 21/77* (2006.01)
*C08J 5/18* (2006.01)
*C08J 7/04* (2020.01)

(52) U.S. Cl.
CPC .......... *G01N 21/77* (2013.01); *C08J 2327/16* (2013.01); *C08J 2427/16* (2013.01); *G01N 2021/7786* (2013.01)

(56) References Cited

U.S. PATENT DOCUMENTS

| | | |
|---|---|---|
| 2008/0286154 A1 | 11/2008 | Kane |
| 2010/0116691 A1 | 5/2010 | Papadimitrakopoulos et al. |
| 2010/0160760 A1 | 6/2010 | Shults et al. |
| 2013/0102024 A1 | 4/2013 | Tian et al. |
| 2015/0192519 A1* | 7/2015 | Schoenfuss ........ G01N 21/6428 250/239 |
| 2017/0049371 A1 | 2/2017 | Emken et al. |
| 2017/0176375 A1 | 6/2017 | Löbbert et al. |

FOREIGN PATENT DOCUMENTS

| | | |
|---|---|---|
| DE | 8907516 U1 | 11/1989 |
| GB | 2132348 A | 7/1984 |
| KR | 20100104659 A | 9/2010 |
| WO | 1992004341 A1 | 3/1992 |
| WO | 1994026726 A1 | 11/1994 |
| WO | 1998017362 A1 | 4/1998 |
| WO | 1998038906 A1 | 9/1998 |
| WO | 1998053894 A1 | 12/1998 |
| WO | 1999022229 A1 | 5/1999 |
| WO | 2003104384 A1 | 12/2003 |
| WO | 2013142886 A1 | 10/2013 |

OTHER PUBLICATIONS

Patent Cooperation Treaty, International Searching Authority, Search Report and Written Opinion for PCT/EP2017/076193, 6 pages, dated Jan. 31, 2018.

* cited by examiner

Figure 3

LAYERS FOR THE DETECTION OF OXYGEN

CROSS-REFERENCE TO RELATED APPLICATIONS

This application is a 371 of PCT/EP2017/076193 filed on 13 Oct. 2017 which claims priority to German Patent Application No. 10 2016 119 810.2 filed on 18 Oct. 2016. The entire content of the applications referenced above is hereby incorporated by reference herein.

FIELD OF THE INVENTION

The invention relates to an oxygen permeable layer for detection of molecular oxygen. The invention additionally relates to a multilayer system for detection of molecular oxygen. The invention further relates to a method for producing the layer, and to the use of the layer or of the multilayer system for detection of molecular oxygen.

BACKGROUND OF THE INVENTION

Luminescent indicator compounds are used for the optical detection of molecular oxygen. The indicator compounds can be excited by irradiation with light of a specific wavelength, and emit a portion of the absorbed light energy as luminescent radiation with a different wavelength. In the presence of oxygen, the luminescence of the indicator compounds is dynamically quenched, in that energy from the excited indicator compounds is transferred to the oxygen in a nonradiative manner. The quantity of oxygen dissolved in the tested medium can be determined on the basis of the quenching or reduction of the luminescence of the indicator compounds. For this purpose, the luminescence quenching is detected, for example by measurement of the luminescence decay time or by a so-called phase modulation technique. With suitable calibration, the oxygen concentration in the tested medium can then be determined using the relationship described by the Stern-Volmer equation.

For quantification of molecular oxygen, the indicator compounds are often embedded in oxygen permeable layers (membranes) through admixture or other incorporation techniques or are physically adsorbed to such layers. The layers, which are also called sensor layers, often have silicone or polydimethylsiloxane as carrier material and generally are produced by means of sol gel processes. However, layers produced by means of sol gel processes are mechanically labile, so that they can be easily destroyed.

In many fields of application, the sensor layers must be stable with respect to chemical stresses.

The layers that are common at the present time are not suitable for applications in a variety of chemicals because some chemicals diffuse into the layers and can dissolve physically adsorbed indicator compounds out of the polymer layer. The dissolving of the indicator compounds out of the layer degrades the quality of the oxygen measurement with increasing operating time, and limits the operating time of the layer.

High chemical stability of the layers is thus necessary to ensure consistent quality of the oxygen measurement and to increase the operating time of the layers.

In addition, there are applications in which the quantity of molecular oxygen in a gas or a liquid must be monitored in real time in order to be able to intervene immediately in the event of deviations from a desired oxygen content. These include, for example, testing of the oxygen content in drinking water, solvents, or solvent-containing gases. Sensor layers with extremely short response times are required for such applications.

A need therefore exists for layers for detection of molecular oxygen that have high chemical and thermal stability and thus permit applications in different chemicals, and that have a very short response time.

SUMMARY OF THE INVENTION

The present invention relates to an oxygen permeable layer for detection of molecular oxygen, wherein the layer has a carrier material in which at least one particle is comprised, wherein the carrier material is polyvinylidene fluoride or a copolymer of polyvinylidene fluoride and the particle comprises a polymer or a copolymer, wherein the polymer or copolymer of the particle has a chemically covalently bonded indicator compound for detection of molecular oxygen.

The invention additionally relates to a multilayer system for detection of molecular oxygen, wherein the multilayer system comprises at least a first oxygen permeable layer and a second oxygen permeable layer, wherein the first layer is a layer according to the invention and the second layer has no indicator compound for detection of molecular oxygen.

The invention further relates to a method for producing the layer according to the invention, the method comprising the steps:
(a) providing a mixture that has a carrier material and at least one particle, wherein the carrier material is polyvinylidene fluoride or a copolymer of polyvinylidene fluoride, and the particle comprises a polymer or a copolymer, wherein the polymer or copolymer of the particle has a chemically covalently bonded indicator compound for detection of molecular oxygen, in a solvent, wherein the solvent is selected such that the carrier material substantially dissolves therein whereas the particles substantially do not dissolve therein;
(b) homogenizing the mixture at a temperature of approximately 15° C. to approximately 25° C. under agitation;
(c) applying the mixture to a carrier foil by knife coating;
(d) precipitating the layer by immersing the carrier foil with the coating from step (c) in a nonsolvent at a temperature of approximately 15° C. to approximately 25° C. in darkness; and
(e) drying the layer.

In addition, the invention relates to the use of a layer according to the invention or of a multilayer system according to the invention for detection of molecular oxygen.

DETAILED DESCRIPTION OF THE INVENTION

In a first aspect, the invention relates to an oxygen permeable layer for detection of molecular oxygen, wherein the layer has a carrier material in which at least one particle is comprised, wherein the carrier material is polyvinylidene fluoride or a copolymer of polyvinylidene fluoride, and the particle comprises a polymer or a copolymer, wherein the polymer or copolymer of the particle has a chemically covalently bonded indicator compound for detection of molecular oxygen.

The layer according to the invention is permeable to oxygen, and thus is suitable for detection of molecular oxygen. The carrier material is polyvinylidene fluoride or a copolymer of polyvinylidene fluoride. Polyvinylidene fluoride, also called polyvinylidene difluoride (PVDF), has high chemical stability with respect to a plurality of solvents. The term "chemical stability" as used herein refers to the resistance of compounds, polymers, copolymers, particles, and other materials to the influence of chemicals. Due to the use of polyvinylidene fluoride or a copolymer of polyvinylidene fluoride as carrier material, the layer has high chemical stability with respect to a plurality of solvents.

The term "copolymer" as used herein refers to a polymer that is composed of two or more different monomers.

In a preferred embodiment, the copolymer of polyvinylidene fluoride is poly(vinylidene fluoride-co-hexafluoropropylene).

At least one particle is comprised in the carrier material. The particle is mechanically immobilized in the carrier material.

The particle comprises a polymer or a copolymer, wherein the polymer or copolymer of the particle has a chemically covalently bonded indicator compound for detection of molecular oxygen. The term "indicator compound" as used herein refers to a compound that exhibits a detectable change in an optical property in response to the presence of molecular oxygen. Examples of known indicator compounds for detection of molecular oxygen are ruthenium complexes, and also unmetallated and metallated porphyrins such as, for instance, platinum(II) meso-tetrakis(pentafluorophenyl)tetrabenzoporphyrin and palladium(II) meso-tetrakis(pentafluorophenyl)tetrabenzoporphyrin.

In a preferred embodiment, the copolymer of the particle is a terpolymer, which is to say a copolymer that is composed of three different monomers or monomer units.

In a preferred embodiment, the particle consists substantially or entirely of the polymer or copolymer.

Indicator compounds that are physically adsorbed to layers or embedded in the carrier material of layers can dissolve out of the polymeric layer material, especially in the case of applications in organic solvents at temperatures above 100° C. As a result, the quality of the oxygen measurement is degraded with increasing operating time, and the operating life of the layer is considerably shortened. Moreover, the measurement system needs to be recalibrated after chemical and thermal stresses. Especially in the case of monitoring of explosive organic solvent-oxygen mixtures in the chemical industry or in the case of pasteurization of oily natural substances or foodstuffs, however, an ability of the layer to withstand repeated and prolonged chemical and thermal stresses is of central importance.

By the covalent bonding of the indicator compound in the polymer or copolymer, a dissolving of the compound out of the layer is prevented. Among other factors, the mobility of the indicator compound is impeded by the covalent bonding to the particle, and transport of the compound out of the layer is made significantly more difficult. For this reason, it is not necessary when using the layer according to the invention—in contrast to layers used until now—to perform a recalibration of the measurement system following a chemical stress at high temperatures.

The high chemical and thermal stability of the layer permits its use for the measurement of oxygen in organic solvents such as, e.g., n-heptane, ethanol, acetonitrile, dichloromethane, and acetone, even at temperatures of over 100° C.

Due to the stability of the layers, consistent quality of the oxygen measurement is ensured and the operating time of the layers is increased. Therefore, oxygen measurement systems with long-term stability and diverse application possibilities can be provided through the use of the layers.

Moreover, the covalent bonding of the indicator compound in the polymer or copolymer facilitates producing the layer by a method of phase inversion. In this method, the carrier material is first dissolved in a solvent such as, e.g., N-methylpyrrolidone, and brought into contact with the at least one particle. Solvents such as N-methylpyrrolidone can dissolve noncovalently bonded indicator compounds out of the polymer or copolymer of the particle. As a result, the optochemical properties of the indicator compound can change in unfavorable ways. Because the polymer or copolymer of the particle has a chemically covalently bonded indicator compound, the indicator compound is prevented from dissolving out. As a result, it is possible to produce the layer according to the invention in a reliable way using methods of phase inversion.

In comparison to sol gel processes, which are used to produce known sensor layers, the method of phase inversion has better reproducibility. Furthermore, layers produced by means of sol gel processes are mechanically labile so that even slight damage to the surface can destroy the layer. The layer according to the invention, in contrast, has good mechanical stability so that the layer can be used in a plurality of application areas.

In summary, the layer according to the invention has higher mechanical, chemical, and thermal stability in comparison to known layers.

In a preferred embodiment, the layer is produced by means of a method of phase inversion. In addition to the good reproducibility, another advantage of the method of phase inversion resides in the fact that polyvinylidene fluoride and copolymers of polyvinylidene fluoride have a porous structure when they have been produced by means of phase inversion processes. A layer according to the invention produced by means of a method of phase inversion therefore has pores. The term "pore" as used herein refers to a cavity in the layer, the cavity having a size or diameter of at least 50 nm. The oxygen permeability of the layer is increased due to the pores. This brings about a reduction in the response time of the layer.

The inventors have determined that a layer according to the invention produced by means of a method of phase inversion has a very short response time. The term "response time" as used herein refers to the response time $t_{90}$, which describes the duration of the signal rise from 0% to 90% of the final signal intensity or the duration of the signal decrease from 100% to 10%. The inventors have determined that the response time of the layer produced by means of a method of phase inversion between the oxygen partial pressures 33 and 200 mbar is between 42 and 84 ms. Therefore, the response time of the layer is shorter than 100 ms. As a result, the layer is especially suitable for applications in which the quantity of molecular oxygen in a gas or a liquid must be monitored in real time. The layer can be used for monitoring of explosive mixtures, for example.

The short response time of the layer is especially advantageous for determination of the quantity of molecular oxygen in a gas.

The larger the diameter of the pores in the layer, the higher the oxygen permeability of the layer is. The maximum size of the pores depends here on the size of the particles that are mechanically held in the carrier material.

In a preferred embodiment, the layer has pores with a diameter of approximately 0.05 μm to approximately 2 μm, preferably of approximately 0.1 μm to approximately 1 μm, further preferred of approximately 0.2 μm to approximately 0.5 μm, further preferred of approximately 0.45 μm to approximately 0.5 μm, further preferred of approximately 0.45 μm. With this pore size, the layer has very good oxygen permeability and the particles remain trapped in the carrier material especially well.

The possibility of chemically binding an indicator compound directly to the carrier material by coupling the indicator compound to appropriately functionalized polymers in the carrier material of a sensor layer is known. However, this requires a chemical modification of the indicator compound, as a result of which the photostability of the compound can be changed in unfavorable ways. In the layer according to the invention, the indicator compound is not bonded directly to the carrier material of the layer. Instead, the indicator compound in the layer according to the invention is only present in the polymer or copolymer of the particle. As a result, the photostability of the compound is preserved during production of the sensor layer. The photostability of the compound is important most notably for applications with high light intensities and for long-duration measurements. Moreover, the polymers of a layer that are functionalized for coupling must have a certain solvent swelling capacity so that the indicator compound can reach the coupling site. If the functionalized polymers are too highly cross-linked during production of the layer, they lose their swelling capacity, so the degree of cross-linking of the polymeric layer material is limited in the case of direct coupling of the indicator compound. In contrast to this, the use of a particle that includes a polymer or a copolymer with the indicator compound facilitates designing the degree of cross-linking of the carrier material of the layer as desired depending on the application area.

For the quantification of molecular oxygen, the layer can be fixed to a transparent substrate, for example a transparent foil. An optical system that has, for example, an excitation light source, a photodetector, suitable optical filters, and analysis electronics, can be positioned behind the transparent substrate. The excitation and emission light can also be transmitted through light guides. The excitation light source can be a light emitting diode (LED), for example. The photodetector usually consists of photodiodes.

In a preferred embodiment, the layer has a thickness of approximately 10 μm to approximately 300 μm, preferably of approximately 50 μm to approximately 250 μm, further preferred of approximately 80 μm to approximately 200 μm.

In a preferred embodiment, the particle comprises a copolymer that is composed of an indicator compound as a first monomer and at least a second monomer, wherein the second monomer is selected from the group consisting of styrene, a monosubstituted styrene, a polysubstituted styrene, a divinylbenzene, an alkyl acrylate, an alkyl methacrylate, bismethacrylate, acrylamide, bis-acrylamide, a vinyl sulfonamide, an O-vinyl ether, and mixtures thereof.

The monosubstituted styrene can be, for example, ortho-vinyltoluene, meta-vinyltoluene, para-vinyltoluene, 2-methylstyrene, 3-methylstyrene, 4-methylstyrene, alpha-methylstyrene (2-phenylpropene), beta-methylstyrene (1-propenylbenzene), 2-ethylstyrene, 3-ethylstyrene, 4-ethylstyrene, meta-isopropyl styrene, para-isopropyl styrene, meta-isobutyl styrene, para-aminostyrene, or para-acetylstyrene.

The polysubstituted styrene can be, for example, 2,4-dimethylstyrene, 2,5-dimethylstyrene, 3,4-dimethylstyrene, 3,5-dimethylstyrene, 2,4,5-trimethylstyrene, or 2,4,6-trimethylstyrene.

The divinylbenzene can be ortho-divinylbenzene, meta-divinylbenzene, para-divinylbenzene, or a mixture of ortho-, meta-, and para-divinylbenzene. The divinylbenzene preferably is meta-divinylbenzene, para-divinylbenzene, or a mixture of meta- and para-divinylbenzene.

The alkyl acrylate can be, for example, methyl acrylate, ethyl acrylate, isopropyl acrylate, n-butyl acrylate isobutyl acrylate, bis-(dimethylamino)-isopropyl acrylate, or 1,1,1,3,3,3-hexafluoroisopropyl acrylate.

The alkyl methacrylate can be, for example, methyl methacrylate, ethyl methacrylate, 2-hydroxyethyl methacrylate, isopropyl methacrylate, n-butyl methacrylate, isobutyl methacrylate, bis-(dimethylamino)-isopropyl methacrylate, or 1,1,1,3,3,3-hexafluoroisopropyl methacrylate.

Bis-acrylamide is also called N,N'-methylenebisacrylamide.

The O-vinyl ether can be, for example, methyl vinyl ether, ethyl vinyl ether, allyl vinyl ether, isopropyl vinyl ether, butyl vinyl ether, isobutyl vinyl ether, tert-butyl vinyl ether, hydroxybutyl vinyl ether, phenyl vinyl ether, benzyl vinyl ether, cyclohexyl vinyl ether, or butanediol divinyl ether.

In a preferred embodiment, the second monomer is a mixture of styrene and a divinylbenzene.

The properties of the copolymer, as for example the degree of cross-linking of the copolymer, can be controlled through the different chemical properties of the units available to choose from for the second monomer.

In an especially preferred embodiment, the copolymer of the particle is a terpolymer, which is composed of an indicator compound as first monomer, a second monomer, and a third monomer. Preferably, the second monomer is selected from the group consisting of styrene, a monosubstituted styrene, a polysubstituted styrene, an alkyl acrylate, an alkyl methacrylate, acrylamide, a vinyl sulfonamide, and an O-vinyl ether, and the third monomer is selected from the group consisting of a divinylbenzene, bismethacrylate, and bis-acrylamide. In this case, the third monomer serves as cross-linker.

In a preferred embodiment, the indicator compound is a compound of formula (I):

Formula (I)

wherein

M is $Pd^{2+}$ or $Pt^{2+}$, each $R^1$ is independently $CF_3$ or H, each $R^2$ is independently $-(CH_2)_n-R^3$ or H, wherein at least one $R^2$ is $-(CH_2)_n-R^3$, each $R^3$ is independently ortho-styryl, meta-styryl, para-styryl, vinyl, acrylamide, methacrylamide, acrylate, methacrylate, vinyl sulfonate, or vinyl sulfonamide, and n is an integer from 0 to 12 in case $R^3$ is vinyl, acrylamide, methacrylamide, acrylate, methacrylate, vinyl sulfonate, or vinyl sulfonamide, and n is an integer from 1 to 12 in case $R^3$ is ortho-styryl, meta-styryl, or para-styryl.

The compound of the formula (I) can be, for example,

Platinum(II)-5,10,15,20-tetra(p-(3-(4-vinylphenyl)propyl)phenyl)-tetrabenzoporphyrin, Platinum(II)-5,10,15,20-tetra(p-(5-methacrylamidopentyl)phenyl)-tetrabenzoporphyrin, Palladium(II)-5,10,15,20-tetra(p-(5-methacrylamidopentyl)phenyl)-tetrabenzoporphyrin, Platinum(II)-5,10,15,20-tetra(p-(6-acryloyloxyhexyl)phenyl)-tetrabenzoporphyrin, or Platinum(II)-5,10,15,20-tetra(p-vinylphenyl)-tetrabenzoporphyrin.

The compound of the formula (I) can be, for example, a regioisomer mixture of

Platinum(II)-5,10,15,20-tetra(p-(4-acryloyloxybutyl)phenyl)-$2^2,7^2,12^2,17^2$-tetra(trifluormethyl)-tetrabenzoporphyrin, Platinum (II)-5,10,15,20-tetra(p-(4-acryloyloxybutyl)phenyl)-$2^2, 7^3, 12^2, 17^3$-tetra(trifluormethyl)-tetrabenzoporphyrin, Platinum(II)-5,10,15,20-tetra(p-(4-acryloyloxybutyl)phenyl)-$2^2, 7^2, 12^3, 17^3$-tetra(trifluormethyl)-tetrabenzoporphyrin, and Platinum(II)-5,10,15,20-tetra(p-(4-acryloyloxybutyl)phenyl)-$2^2,7^2,12^2,17^3$-tetra(trifluormethyl)-tetrabenzoporphyrin.

The compound of the formula (I) can be, for example, a regioisomer mixture of

Palladium(II)-5,10,15,20-tetra(p-(3-acrylamidopropyl)phenyl)-$2^2,7^2,12^2,17^2$-tetra(trifluormethyl)-tetrabenzoporphyrin, Palladium(II)-5,10,15,20-tetra(p-(3-acrylamidopropyl)phenyl)-$2^2, 7^3, 12^2, 17^3$-tetra(trifluormethyl)-tetrabenzoporphyrin,

Palladium(II)-5,10,15,20-tetra(p-(3-acrylamidopropyl)phenyl)-$2^2, 7^2, 12^3, 17^3$-tetra(trifluormethyl)-tetrabenzoporphyrin, and Palladium(II)-5,10,15,20-tetra(p-(3-acrylamidopropyl)phenyl)-$2^2, 7^2, 12^2,17^3$-tetra(trifluormethyl)-tetrabenzoporphyrin.

A copolymer in which a compound of the formula (I) is chemically covalently bonded is, for example, poly(platinum(II)-5,10,15,20-tetra(p-vinylphenyl)-tetrabenzoporphyrin-co-divinylbenzene).

A terpolymer in which a compound of the formula (I) is chemically covalently bonded is, for example, poly(platinum(II)-5,10,15,20-tetra(p-vinylphenyl)-tetrabenzoporphyrin-co-styrene-co-divinylbenzene) or poly(platinum(II)-5,10,15,20-tetra(p-(6-acryloyloxyhexyl)phenyl)-tetrabenzoporphyrin-co-styrene-co-divinylbenzene.

In a preferred embodiment, the indicator compound is a compound of formula (II):

Formula (II)

wherein

M is $Pd^{2+}$ or $Pt^{2+}$, each $R^1$ is independently $CF_3$ or H, each $R^2$ is independently $-(CH_2)_n-R^3$ or H, wherein at least one $R^2$ is $-(CH_2)_n-R^3$, each $R^3$ is independently ortho-styryl, meta-styryl, para-styryl, vinyl, acrylamide, methacrylamide, acrylate, methacrylate, vinyl sulfonate, or vinyl sulfonamide, and n is an integer from 1 to 12.

The compound of the formula (II) can be, for example, platinum(II)-5,10,15,20-tetra(4'-(3-acrylamidopropyl)-2,3,5,6-tetrafluor-[1,1'-biphenyl]-4-yl)-tetrabenzoporphyrin, palladium(II)-5,10,15,20-tetra(2,3,5,6-tetrafluor-4'-(methacryloyloxy)-[1,1'-biphenyl]-4-yl)-tetrabenzoporphyrin, platinum(II)-5,10,15,20-tetra(2,3,5,6-tetrafluor-4'-vinyl-[1,1'-biphenyl]-4-yl)-tetrabenzoporphyrin, or platinum(II)-5,10,15,20-tetra(2,3,5,6-tetrafluor-4'-(undec-10-en-1-yl)-[1,1'-biphenyl]-4-yl)-tetrabenzoporphyrin.

The compound of the formula (II) can be, for example, a regioisomer mixture of platinum(II)-5,10,15,20-tetra(2,3,5,6-tetrafluor-4'-vinyl-[1,1'-biphenyl]-4-yl)-$2^2,7^2,12^2,17^2$-tetra(trifluormethyl)-tetrabenzoporphyrin, platinum(II)-5,10,15,20-tetra(2,3,5,6-tetrafluor-4'-vinyl-[1,1'-biphenyl]-4-yl)-$2^2, 7^2, 12^3, 17^3$-tetra(trifluormethyl)-tetrabenzoporphyrin, platinum(II)-5,10,15,20-tetra(2,3,5,6-tetrafluor-4'-vinyl-[1,1'-biphenyl]-4-yl)-$2^2,7^3,12^2,17^3$-tetra(trifluormethyl)-tetrabenzoporphyrin, and platinum(II)-5,10,15,20-tetra(2,3,5,6-tetrafluor-4'-vinyl-[1,1'-biphenyl]-4-yl)-$2^2,7^2,12^2,17^3$-tetra(trifluormethyl)-tetrabenzoporphyrin.

A copolymer in which a compound of the formula (II) is chemically covalently bonded is, for example, poly(platinum(II)-5,10,15,20-tetra(4'-(3-acrylamidopropyl)-2,3,5,6-tetrafluor-[1,1'-biphenyl]-4-yl)-tetrabenzoporphyrin-co-divinylbenzene).

A terpolymer in which a compound of the formula (II) is chemically covalently bonded is, for example, poly(platinum(II)-5,10,15,20-tetra(4'-(3-acrylamidopropyl)-2,3,5,6-tetrafluor-[1,1'-biphenyl]-4-yl)-tetrabenzoporphyrin-co-styrene-co-divinylbenzene) or poly(palladium(II)-5,10,15,20-tetra(2,3,5,6-tetrafluor-4'-(methacryloyloxy)-[1,1'-biphenyl]-4-yl)-tetrabenzoporphyrin-co-styrene-co-divinylbenzene).

The compounds of the formulas (I) and (II) ere especially suitable as indicator compounds for the layer according to the invention. $R^3$ is a polymerizable unit that permits a polymerization, in particular a free-radical polymerization, of the compounds. As a result, the compounds can be covalently bonded in a copolymer. The polymerization reaction can be a free-radical polymerization, an anionic polymerization, or a cationic polymerization.

The compounds of the formulas (I) and (II) luminesce in the near infrared range and have a high photostability and a very good quantum efficiency. The term "photostability" as used herein refers to the stability of a compound under the action of light. In this context, a high photostability means that the action of light does not lead to a breakdown and/or a photobleaching of the compound, or does so only to a slight degree. A photobleaching or fading of the compound means a decrease in the intensity of the luminescence of the compound that is caused by a destruction of the compound due to the action of light.

The compounds of the formulas (I) and (II), in comparison to structurally related, known indicator compounds such as platinum(II) meso-tetrakis(pentafluorophenyl)tetrabenzoporphyrin and palladium(II) meso-tetrakis(pentafluorophenyl)tetrabenzoporphyrin, have a higher chemical stability with respect to oxidizing substances. Examples of oxidizing substances include solutions of sodium hypochlorite and/or potassium hypochlorite, peracetic acid, performic acid, perpropionic acid, hydrogen peroxide, and dissolved chlorine dioxide. Consequently, when a compound of the formula (I) or (II) is used, the layer also has, in addition, a high chemical stability with respect to oxidizing substances.

In a preferred embodiment, the particles have a mean particle size of approximately 0.1 μm to approximately 50 μm, preferably of approximately 2 μm to approximately 30 μm, further preferred of approximately 5 μm to approximately 10 μm.

In a preferred embodiment, a plurality of particles is comprised in the carrier material, and the particles preferably are homogeneously distributed in the carrier material. Due to the homogeneous distribution of the particles, there is no agglomeration of the particles in the carrier material. An agglomeration of the particles can lead to an increase in the response time of the layer.

In order to achieve better signal quality, the layer according to the invention can be provided with one or more additional oxygen-permeable layers that have no indicator compound.

In a second aspect, the invention relates to a multilayer system for detection of molecular oxygen, wherein the multilayer system comprises at least a first oxygen permeable layer and a second oxygen permeable layer, wherein the first layer is a layer according to the invention and the second layer has no indicator compound for detection of molecular oxygen.

The inventors have determined that the multilayer system according to the invention also has a very short response time of less than 100 ms. As a result, the multilayer system can be used for monitoring an oxygen content in real time.

The second layer is preferably applied to the first layer. A second layer applied to the first layer can, for example, serve as a protective layer in order to avoid direct contact of the first layer with the medium to be tested. As a result, the first layer is protected against mechanical damage. Because the second layer has no indicator compound for detection of molecular oxygen, moreover, chemical reactions of the indicator compound with components of the medium to be tested are prevented.

The second layer can consist of polyvinylidene fluoride, polytetrafluoroethylene, cellulose acetate, or cellulose nitrate, for example.

In a preferred embodiment, the second layer consists of polyvinylidene fluoride, preferably of porous polyvinylidene fluoride. Porous polyvinylidene fluoride has good oxygen permeability and high chemical stability with respect to a plurality of solvents.

In a preferred embodiment, the second layer is colored white. The luminous efficiency of the multilayer system is improved as a result.

In a preferred embodiment, the second layer has a thickness of approximately 10 μm to approximately 300 μm, preferably of approximately 10 μm to approximately 200 μm, further preferred of approximately 45 μm to approximately 130 μm.

In a preferred embodiment, the multilayer system further comprises a third oxygen permeable layer, which has no indicator compound for detection of molecular oxygen. The third layer is preferably applied to the second layer. The third layer preferably comes into contact with the medium to be tested during use of the multilayer system, and is colored black. As a result, entry of extraneous light is prevented.

In a third aspect, the invention relates to a method for producing the layer according to the invention, the method comprising the steps:
(a) providing a mixture that has a carrier material and at least one particle, wherein the carrier material is polyvinylidene fluoride or a copolymer of polyvinylidene fluoride, and the particle comprises a polymer or a copolymer, wherein the polymer or copolymer of the particle has a chemically covalently bonded indicator compound for detection of molecular oxygen, in a solvent, wherein the solvent is selected such that the carrier material substantially dissolves therein whereas the particles substantially do not dissolve therein;
(b) homogenizing the mixture at a temperature of approximately 15° C. to approximately 25° C. under agitation;
(c) applying the mixture to a carrier foil by knife coating;
(d) precipitating the layer by immersing the carrier foil with the coating from step (c) in a nonsolvent at a temperature of approximately 15° C. to approximately 25° C. in darkness; and
(e) drying the layer.

The method according to the invention is a method of phase inversion. For the method of phase inversion, the solvent must be selected such that the carrier material substantially dissolves therein whereas the particles substantially do not dissolve therein. Accordingly, the nonsolvent is selected such that the carrier material substantially does not dissolve therein.

In comparison to sol gel processes, with which known sensor layers are produced, the method of phase inversion has better reproducibility. Moreover, layers produced by means of sol gel processes are mechanically labile, so that the layer can be easily damaged. The layer according to the invention, in contrast, has good mechanical stability so that the layer can be used in a plurality of application areas.

The particles are first distributed in the carrier material as homogeneously as possible. For this purpose, the mixture is incubated at a temperature of approximately 15° C. to approximately 25° C., for example at 20° C., under agitation. The homogenization step can be carried out for several hours, for example 4 hours.

The knife coating of the mixture on the carrier foil can be carried out with a metal doctor blade, for example. The knife coating is preferably performed at a temperature of approximately 15° C. to approximately 25° C., for example at 20° C.

The carrier foil can be, for example, a polypropylene foil or a polyvinylidene fluoride foil.

By immersing the carrier foil with the coating from step (c) in a nonsolvent, the solvent goes into solution, and the coating precipitates as a layer while forming pores.

The drying of the layer can take place at a temperature of 90° C., for example. Preferably, the drying is accomplished in a drying cabinet or an oven. The drying step can be carried out for several hours, for example 16 hours.

After the drying, the layer can be detached from the carrier foil or can be used together with the carrier foil as a multilayer system.

In a preferred embodiment, the solvent is N-methylpyrrolidone, dimethylacetamide, dimethylformamide, hexamethylphosphoric triamide, trimethyl phosphate, triethyl phosphate, or dimethyl sulfoxide, preferably dimethylacetamide.

In a preferred embodiment, the nonsolvent is deionized water, methanol, ethanol, butanol, or a mixture thereof, preferably deionized water.

In another aspect, the invention relates to the use of a layer according to the invention or the use of a multilayer system according to the invention for detection of molecular oxygen, preferably for the quantitative detection of molecular oxygen.

The molecular oxygen can be identified in solid, gaseous, or liquid media. In a preferred embodiment, the layer or the multilayer system is used for the measurement of oxygen in vapors of organic solvents. In another embodiment, dissolved molecular oxygen is measured in a liquid medium, preferably in an organic solvent.

EXAMPLES

Example 1

Production of Layers and Two-Layer Systems for Measurement of Molecular Oxygen by Means of Methods of Phase Inversion Preparation

| Reagent | Quantity |
| --- | --- |
| A) particles | 430 mg |
| B) polyvinylidene fluoride | 1.00 g |
| C) N-methylpyrrolidone | 15 ml |

1.00 g pellets of polyvinylidene fluoride (PVDF) are dissolved in 15 ml N-methylpyrrolidone. After complete dissolution, 430 mg particles of poly(platinum(II)-5,10,15,20-tetra(p-(6-acryloxyhexyl)phenyl)-tetrabenzoporphyrin-co-styrene-co-divinylbenzene) are added, and agitated for at least 4 additional hours. The homogeneous mass is then knife-coated onto a polypropylene carrier foil using a laboratory doctor blade (200 micrometer setting) in order to produce a layer or a single-layer membrane, or knife-coated onto a porous PVDF foil in order to produce a two-layer system or a two-layer membrane. Immediately after that, the foil along with coating is immersed in a water trough that is filled with deionized water, and allowed to stand in darkness at least 12 hours for precipitation. The membranes are then dried at 90° C. for 16 hours in the oven.

Example 2

Use of the Layer for Measurement of Molecular Oxygen

Figure 1:
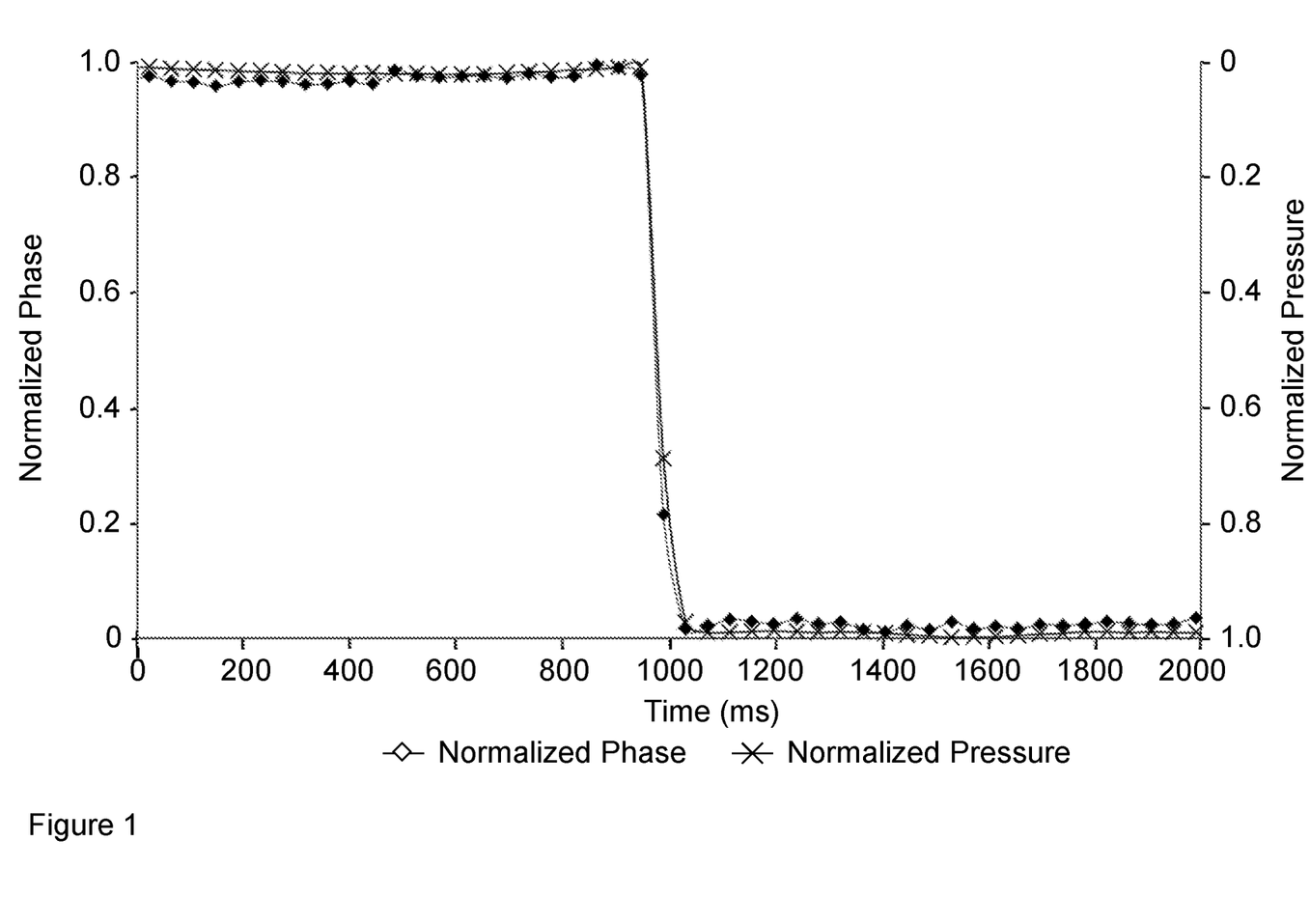
FIG. 1 shows the measurement of molecular oxygen using the layer according to the invention.

In order to test the response time of the layer from Example 1, a very fast pressure change is carried out between a low pressure of 160 mbar (normalized to 0.00) and atmospheric air pressure of 960 mbar (normalized to 1.00). During the measurement, the pressure change is concurrently measured by means of a fast pressure sensor (PAA-M5 HB, Keller A G, Winterthur, Switzerland). The measured values are recorded for both sensors (pressure sensor and oxygen sensor) every 42 milliseconds. In order to better visualize the results, the experimentally obtained data for the phase are likewise normalized, and are plotted together in a graph (FIG. 1). The measured values of the pressure sensor are represented by crosses. The measured values of the phase change corresponding to the partial pressure of oxygen are represented by black squares. With a pressure change from 0.00 to 1.00, the phase changes within two measured values (2×42 ms=84 ms), which is to say that the response time ($t_{90}$) between the oxygen partial pressures 33 and 200 mbar is between 42 and 84 ms. Consequently, the phase change corresponding to the partial pressure of oxygen is achieved by the layer in less than 100 ms.

Example 3

Use of the Two-Layer System for Measurement of Molecular Oxygen

Figure 2:
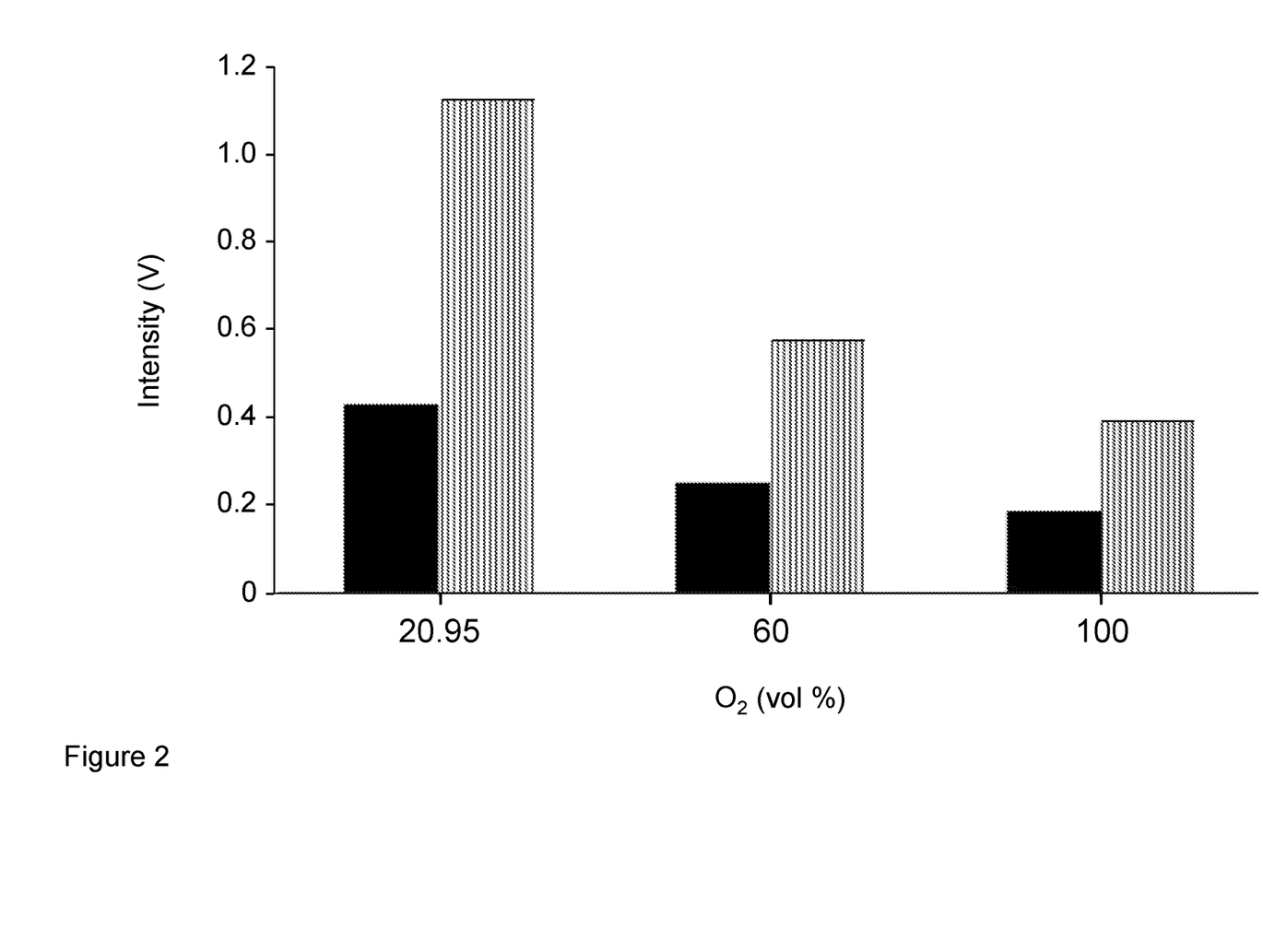
FIG. 2 shows the measurement of the intensity at different oxygen concentrations using the layer according to the invention and the multilayer system according to the invention.
Figure 3:
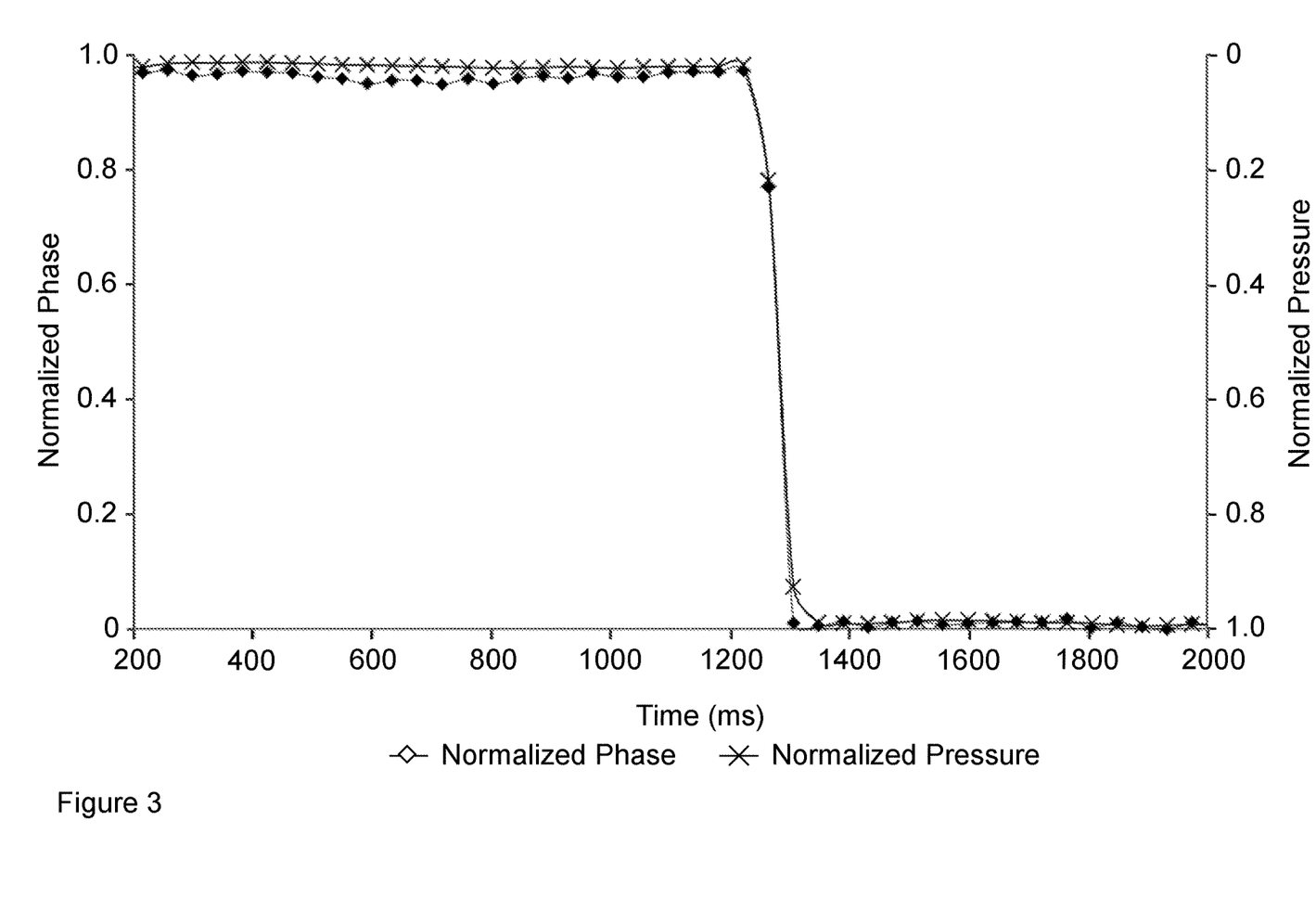
FIG. 3 shows the measurement of molecular oxygen using the multilayer system according to the invention.

The two-layer system from Example 1 is likewise used for measurements of molecular oxygen. The second layer, which is simultaneously used as carrier foil in the method of phase inversion, consists of a porous, white PVDF membrane with a thickness of 130 μm that permits the unhindered diffusion of molecular oxygen. FIG. 2 shows the improvement in the intensity of the two-layer system (shaded bars) in comparison with the single-layer layer (black bars) at different oxygen concentrations at room temperature. The intensity is measured in volts. A photodiode is used as detector. A light-emitting diode that emits radiation with a wavelength of approximately 500 nm at a repetition rate of 8 kHz is used as excitation light source. FIG. 3 shows the determination of the response time of the two-layer system, which is carried out as in Example 2. The results show that an increase in intensity by more than a factor of two is achieved with the two-layer system in comparison with the single-layer layer without reducing the response time ($t_{90}$) in so doing. Consequently, the phase change corresponding to the partial pressure of oxygen is also achieved in less than 100 ms by the two-layer system.

The invention claimed is:

1. Oxygen permeable layer for detection of molecular oxygen, wherein the layer comprises a carrier material, wherein the carrier material is polyvinylidene fluoride or a copolymer of polyvinylidene fluoride, and wherein the carrier material comprises at least one particle, wherein the particle comprises a polymer or a copolymer, wherein the polymer or copolymer of the particle comprises a chemically covalently bonded indicator compound for detection of molecular oxygen, and the particle is mechanically immobilized in the carrier material;

wherein the indicator compound is selected from a compound of formula (I):

Formula (I)

wherein

M is $Pd^{2+}$ or $Pt^{2+}$, each $R^1$ is independently $CF_3$ or H, each $R^2$ is independently $-(CH_2)_n-R^3$ or H, wherein at least one $R^2$ is $-(CH_2)_n-R^3$, each $R^3$ is independently ortho-styryl, meta-styryl, para-styryl, vinyl, acrylamide, methacrylamide, acrylate, methacrylate, vinyl sulfonate or vinyl sulfonamide, and n is an integer from 0 to 12 in case $R^3$ is vinyl, acrylamide, methacrylamide, acrylate, methacrylate, vinyl sulfonate, or vinyl sulfonamide, and n is an integer from 1 to 12 in case $R^3$ is ortho-styryl, meta-styryl, or para-styryl, and a compound of formula (II):

Formula (II)

wherein

M is $Pd^{2+}$ or $Pt^{2+}$, each $R^1$ is independently $CF_3$ or H, each $R^2$ is independently $-(CH_2)_n-R^3$ or H, wherein at least one $R^2$ is $-(CH_2)_n-R^3$, each $R^3$ is independently ortho-styryl, meta-styryl, para-styryl, vinyl, acrylamide, methacrylamide, acrylate, methacrylate, vinyl sulfonate, or vinyl sulfonamide, and n is an integer from 1 to 12.

2. Layer according to claim 1, wherein the layer has a thickness of approximately 10 μm to approximately 300 μm.

3. Layer according to claim 1, wherein the layer has pores with a diameter of approximately 0.05 μm to approximately 2 μm.

4. Layer according to claim 1, wherein the particle comprises a copolymer that is composed of an indicator compound as a first monomer and at least a second monomer, wherein the second monomer is selected from the group consisting of styrene, a monosubstituted styrene, a polysubstituted styrene, a divinylbenzene, an alkyl acrylate, an alkyl methacrylate, bismethacrylate, acrylamide, bis-acrylamide, a vinyl sulfonamide, an O-vinyl ether, and mixtures thereof.

5. Layer according to claim 1, wherein the particle has a mean particle size of approximately 0.1 μm to approximately 50 μm.

6. Layer according to claim 1, wherein a plurality of particles is comprised in the carrier material, and the particles preferably are homogeneously distributed in the carrier material.

7. Layer according to claim 1, wherein the particle has a mean particle size of approximately 2 μm to approximately 30 μm.

8. Layer according to claim 1 wherein the layer has a response time of less than 100 ms.

9. Multilayer system for detection of molecular oxygen, wherein the multilayer system comprises at least a first oxygen permeable layer and a second oxygen permeable layer, wherein the first layer is a layer according to claim 1, and the second layer has no indicator compound for detection of molecular oxygen.

10. Multilayer system according to claim 9, wherein the second layer consists of porous polyvinylidene fluoride.

11. Multilayer system according to claim 9, wherein the second layer is colored white.

12. A method of detecting of molecular oxygen in a medium, comprising contacting a multilayer system according to claim 9 with the medium.

13. A phase inversion method for producing the layer according to claim 1, the method comprising the steps:
(a) providing a mixture that has a carrier material and at least one particle, wherein the carrier material is polyvinylidene fluoride or a copolymer of polyvinylidene fluoride, and the particle comprises a polymer or a copolymer, wherein the polymer or copolymer of the particle has a chemically covalently bonded indicator compound for detection of molecular oxygen, in a solvent, wherein the solvent is selected such that the carrier material substantially dissolves therein whereas the particles substantially do not dissolve therein;
(b) homogenizing the mixture at a temperature of approximately 15° C. to approximately 25° C. under agitation;
(c) applying the mixture to a carrier foil by knife coating;
(d) precipitating the layer by immersing the carrier foil with the coating from step (c) in a nonsolvent at a temperature of approximately 15° C. to approximately 25° C. in darkness; and (e) drying the layer.

14. Method according to claim 13, wherein the solvent is N-methylpyrrolidone, dimethylacetamide, dimethylformamide, hexamethylphosphoric triamide, trimethyl phosphate, triethyl phosphate, or dimethyl sulfoxide.

15. Method according to claim 13, wherein the nonsolvent is deionized water, methanol, ethanol, butanol, or a mixture thereof.

16. Method according to claim 13 wherein the layer has pores of at least 50 nm in diameter.

17. A method of detecting molecular oxygen in a medium, comprising contacting a layer of claim 1 with the medium.

18. The method of claim 17, wherein the medium is a solid, gaseous or liquid medium.

19. The method of claim 17, wherein the medium is a vapor of an organic solvent.

20. The method of claim 17, wherein the medium is a liquid medium, and the liquid is an organic solvent.

\* \* \* \* \*